(12) United States Patent
Statnikov

(10) Patent No.: US 7,431,779 B2
(45) Date of Patent: *Oct. 7, 2008

(54) ULTRASONIC IMPACT MACHINING OF BODY SURFACES TO CORRECT DEFECTS AND STRENGTHEN WORK SURFACES

(75) Inventor: Efim S. Statnikov, Birmingham, AL (US)

(73) Assignee: U.I.T., L.L.C., Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/167,863

(22) Filed: Jun. 28, 2005

(65) Prior Publication Data

US 2006/0237104 A1   Oct. 26, 2006

Related U.S. Application Data

(60) Division of application No. 10/207,859, filed on Jul. 31, 2002, now Pat. No. 6,932,876, which is a continuation-in-part of application No. 09/653,987, filed on Sep. 1, 2000, now Pat. No. 6,458,225, which is a continuation-in-part of application No. 09/288,020, filed on Apr. 8, 1999, now Pat. No. 6,338,765, and a continuation-in-part of application No. 09/273,769, filed on Mar. 23, 1999, now Pat. No. 6,289,736, which is a continuation-in-part of application No. 09/145,992, filed on Sep. 3, 1998, now Pat. No. 6,171,415.

(51) Int. Cl.
*C21D 1/04* (2006.01)
(52) U.S. Cl. .................... 148/400; 148/902; 428/612; 428/687
(58) Field of Classification Search ............... 148/400, 148/902, 903; 428/600, 612, 687
See application file for complete search history.

(56) References Cited

U.S. PATENT DOCUMENTS

RE16,599 E    4/1927  Mattice (Continued)

FOREIGN PATENT DOCUMENTS

EP    0 524 156 A1    1/1993

(Continued)

OTHER PUBLICATIONS

U.S. Appl. No. 11/312,382, filed Dec. 21, 2005, Statnikov.

(Continued)

*Primary Examiner*—George Wyszomierski
(74) *Attorney, Agent, or Firm*—Foley & Lardner LLP

(57) ABSTRACT

Metallic workpieces of diverse shapes having work surfaces which are deformed at the surface and adjacent sub-surface layers by surface impact from ultrasonic transducers employing freely axially moving impacting elements propelled and energized by a transducer oscillating surface vibrating periodically at an ultrasonic frequency. The impacting elements are propelled in a random aperiodic and controlled impact mode at different phases of the periodic oscillation cycles. The transducer may be portable and provides a series of mechanically interconnected stages having mechanical resonances harmonically related as a multiple of the primary ultrasonic frequency and have matched stage resistances under instantaneous loading when the impact elements are driven by the transducer oscillating surface into the surface of the workpiece. This mode of operation produces Q-factor amplification of the input ultrasonic power oscillator energy at the impact needles and high propulsion velocities making it possible to machine metallic workpiece bodies to greater depths for compressing the metal to increase compressive strength of the workpiece work surfaces to substantially the ultimate material strength. The impact machining is done at ambient temperatures.

6 Claims, 5 Drawing Sheets

U.S. PATENT DOCUMENTS

| | | | |
|---|---|---|---|
| 1,703,111 A | 2/1929 | Kniatt | |
| 1,770,932 A | 7/1930 | Leake | |
| 2,537,533 A | 1/1951 | Ingalls | |
| 3,210,843 A | 10/1965 | Seul et al. | |
| 3,274,033 A | 9/1966 | Jacke | |
| 3,622,404 A | 11/1971 | Thompson | |
| 3,650,016 A | 3/1972 | McMaster | |
| 3,661,655 A * | 5/1972 | Hrusovsky | 148/578 |
| 3,782,160 A | 1/1974 | Kheifets et al. | |
| 3,864,542 A | 2/1975 | Fletcher et al. | |
| 3,945,098 A | 3/1976 | Yascheritsyn et al. | |
| 3,961,739 A | 6/1976 | Leftheris | |
| 4,049,186 A | 9/1977 | Hanneman et al. | |
| 4,126,031 A | 11/1978 | Ignashev et al. | |
| 4,214,923 A | 7/1980 | Price | |
| 4,250,726 A | 2/1981 | Safian et al. | |
| 4,330,699 A | 5/1982 | Farrow | |
| 4,453,392 A | 6/1984 | Klubovich et al. | |
| 4,491,001 A | 1/1985 | Yoshida et al. | |
| 4,624,402 A | 11/1986 | Pitcairn et al. | |
| 4,823,599 A | 4/1989 | Schneider | |
| 4,887,662 A * | 12/1989 | Tanaka et al. | 164/427 |
| 4,968,359 A | 11/1990 | Hebel, Jr. et al. | |
| 5,035,142 A | 7/1991 | Dryga et al. | |
| 5,166,885 A | 11/1992 | Thompson | |
| 5,193,375 A | 3/1993 | Meister | |
| 5,242,512 A | 9/1993 | Bagley et al. | |
| 5,286,313 A | 2/1994 | Schultz et al. | |
| 5,302,218 A * | 4/1994 | Shirai et al. | 148/695 |
| 5,330,790 A | 7/1994 | Calkins | |
| 5,352,305 A | 10/1994 | Hester | |
| 5,525,429 A * | 6/1996 | Mannava et al. | 428/610 |
| 5,569,018 A * | 10/1996 | Mannava et al. | 415/200 |
| 5,654,992 A | 8/1997 | Uraki et al. | |
| 5,664,648 A | 9/1997 | Hester | |
| 5,674,328 A * | 10/1997 | Mannava et al. | 148/525 |
| 5,756,965 A * | 5/1998 | Mannava | 219/121.85 |
| 5,771,729 A * | 6/1998 | Bailey et al. | 72/53 |
| 5,826,453 A | 10/1998 | Prevey, III | |
| 5,841,033 A | 11/1998 | Burris et al. | |
| 5,976,314 A | 11/1999 | Sans | |
| 6,144,012 A * | 11/2000 | Dulaney et al. | 219/121.85 |
| 6,171,415 B1 | 1/2001 | Statnikov | |
| 6,223,974 B1 | 5/2001 | Unde | |
| 6,225,598 B1 | 5/2001 | Nihei et al. | |
| 6,269,669 B1 | 8/2001 | Matsubara et al. | |
| 6,289,705 B1 | 9/2001 | Duquenne et al. | |
| 6,289,736 B1 | 9/2001 | Statnikov | |
| 6,338,765 B1 | 1/2002 | Statnikov | |
| 6,458,225 B1 | 10/2002 | Statnikov | |
| 6,467,321 B2 | 10/2002 | Prokopenko et al. | |
| 6,517,319 B2 | 2/2003 | Webster et al. | |
| 6,722,175 B2 | 4/2004 | Statnikov | |
| 6,843,957 B2 | 1/2005 | Statnikov | |
| 6,932,876 B1 | 8/2005 | Statnikov | |
| 7,032,725 B2 | 4/2006 | Statnikov | |
| 2002/0014100 A1 | 2/2002 | Prokopenko et al. | |
| 2002/0037219 A1 | 3/2002 | Webster et al. | |
| 2002/0043313 A1 | 4/2002 | Statnikov | |
| 2004/0173290 A1 | 9/2004 | Statnikov | |
| 2004/0244882 A1 | 12/2004 | Lobanov et al. | |
| 2005/0092397 A1 | 5/2005 | Statanikov | |
| 2005/0145306 A1 | 7/2005 | Statnikov | |
| 2005/0242066 A1 | 11/2005 | Statnikov | |
| 2006/0016858 A1 | 1/2006 | Statnikov et al. | |
| 2006/0057836 A1 | 3/2006 | Nagarajan et al. | |

FOREIGN PATENT DOCUMENTS

| | | |
|---|---|---|
| FR | 2 662 180 A1 | 11/1991 |
| JP | 55-4435 A | 1/1980 |
| JP | 09-001666 A | 1/1997 |
| JP | 2004-122144 A | 4/2004 |
| JP | 2004-122152 A | 4/2004 |
| JP | 2004-149843 A | 5/2004 |
| JP | 2004-167519 A | 6/2004 |
| JP | 2004-169340 A | 6/2004 |
| RU | 2 037 387 C1 | 6/1995 |
| RU | 2 068 741 C1 | 11/1996 |
| RU | 2 106 480 C1 | 3/1998 |
| SU | 563 193 A | 8/1977 |
| SU | 931236 B | 6/1982 |
| SU | 946 841 B | 8/1982 |
| SU | 983 469 A | 12/1982 |
| SU | 1 039 582 A | 9/1983 |
| SU | 1 206 032 A | 1/1986 |
| SU | 1 235 932 A | 6/1986 |
| SU | 1 413 598 A | 7/1988 |
| SU | 1 420 035 A | 8/1988 |
| SU | 1 735 400 A1 | 5/1992 |
| SU | 1 752 448 A1 | 8/1992 |
| SU | 1 772 646 A1 | 10/1992 |
| SU | 1794637 A1 | 2/1993 |
| WO | WO 91/17273 A1 | 11/1991 |
| WO | WO 93/20247 A1 | 10/1993 |
| WO | WO 94/01962 A1 | 1/1994 |
| WO | WO 98/43748 A1 | 10/1998 |
| WO | WO 98/43749 A1 | 10/1998 |
| WO | WO 02/101097 A1 | 12/2002 |
| WO | WO 2004/013359 A1 | 2/2004 |
| WO | WO 2006/057836 A2 | 6/2006 |

OTHER PUBLICATIONS

U.S. Appl. No. 11/342,846, filed Jan. 31, 2006, Statnikov.
U.S. Appl. No. 11/405,523, filed Apr. 18, 2006, Statnikov.
Fisher et al., "Fatigue Strength Improvement of Bridge girders by Ultrasonic Impact Treatment (UIT)," IIW/IIS Document XIII-1916-02, Copenhagen, 2002, 15 pgs.
Fisher et al., "Fatigue strength enhancement by means of weld design change and the application of ultrasonic impact treatment," 14 pgs.
Galtier et al., "The influence of ultrasonic impact treatment on fatigue behaviour of welded joints in high-strength steel," IIW/IIS Document XIII-1976-03, Bucharest, 2003, 12 pgs.
Guenther et al., "Rehabilitation of Welded Joints by Ultrasonic Impact Treatment (UIT)," IABSE Symposium, Lisbon, 2005, 7 pgs.
Haagensen et al., "Introductory fatigue tests on welded joints in high strength steel and aluminium improved by various methods including ultrasonic impact treatment (UIT)," IIW Doc. XIII-1748-98, Hamburg, 1998, 12 pgs.
Janosch et al., "Improvement of fatigue strength in welded joint (in HSS and aluminium alloy) by ultrasonic hammer peening," IIW Doc. XIII-1594-95, Stockholm, 1995, 21 pgs.
Kudryavtsev et al., "Increasing the fatigue strength of welded joints in cyclic compression," IIW Doc. XIII-1569-94, Beijing, 1994, 6 pgs.
Lihavainen et al., "Fatigue strength of a longitudinal attachment improved by ultrasonic impact treatment," IIW Doc. XIII-1990-03, Bucharest, 2003, 12 pgs.
Roy et al., "Improving Fatigue Strength of Welded Joints by Ultrasonic Impact Treatment," (http:://www.appliedultrasonics.com/Research.htm), 6 pgs.
Roy et al., "Enhancing Fatigue Strength by Ultrasonic Impact Treatment," (http://www.appliedultrasonics.com/Research.htm), 35 pgs.
Statnikov et al., "Efficiency Evaluation of Ultrasonic Impact Treatment (UIT) of Welded Joints in Weldox 420 Steel in accordance with the IIW Program," (http://www.appliedultrasonics.com/Research.htm), 30 pgs.
Statnikov et al., "Repair Case Study," IIW Doc XIII-WG5-18-98, Hamburg, 1998, 8 pgs.
Statnikov, E.S., "Guide for application of ultrasonic impact treatment for improving fatigue life of welded structures," IIW/IIS—Doc. XIII-1757-99, Lisbon, 1999, 19 pgs.

Statnikov et al., "Comparison of Ultrasonic Impact Treatment (UIT) and other Fatigue Life Improvement Methods," IIW/IIS—Document XIII-1817-00, Florence, 2000, 27 pgs.

Statnikov, E.S., "Repair of Fatigue Loaded Weld Structures," IIW Doc. XIII-WG-1873-01, Slovenia, 2001, 6 pgs.

Statnikov et al., "Comparison and the Improvement in corrosion Fatigue Strength of Weld Repaired Marine Cu 3-grade Bronze Propellers by Ultrasonic Impact Treatment (UIT) or Heat Treatment," IIW/IIS—Doc. XIII-1964-03, Bucharest 2003, 34 pgs.

Statnikov et al., "Specification for weld toe improvement by ultrasonic impact treatment," IIW Doc. XIII-1617-96, Budapest, 1996, 10 pgs.

Statnikov et al., "Ultrasonic impact treatment (UIT) of welded joints (Summary of the method)," Budapest, 1996, 3 pgs.

Statnikov, E.Sh., "Applications of operational ultrasonic impact treatment (UIT) technologies in production of welded joints," IIW/IIS—Doc XIII-1667-97, 17 pgs, 1997.

Statnikov, E.Sh., "Comparison of post-weld deformation methods for increase in fatigue strength of welded joints," IIW/IIS—Doc. XIII-1668-97, San Francisco, 1997, 7 pgs.

Statnikov, E.S., "Guide for application of ultrasonic impact treatment improving fatigue life of welded structures," IIW/IIS—Doc. XIII-1757-99, Lisbon, 1999, 17 pgs.

Statnikov, E., "Physics and mechanism of ultrasonic impact treatment," IIW Doc. XIII-2004-04, 30 pgs.

Trufyakov et al., "Ultrasonic Impact Treatment of Welded Joints," IIW Doc. XIII-1609-95, 10 pgs, 1995.

Trufiakov et al., "The Efficiency of Ultrasonic Impact Treatment for Improving the Fatigue Strength of Welded Joints," IIW Doc. XIII-1745-98, Hamburg, 1998, 12 pgs.

Wright, W., "Post-weld treatment of a welded bridge girder by ultrasonic impact treatment," Sep. 29, 1996, 6 pgs.

* cited by examiner

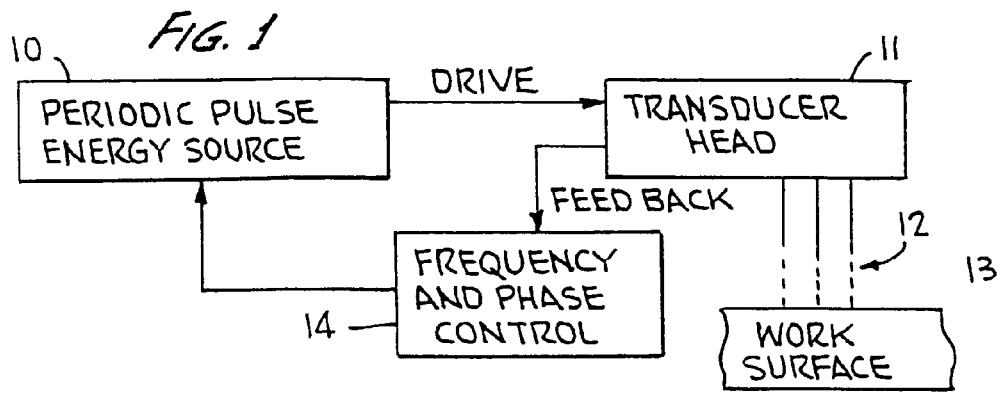
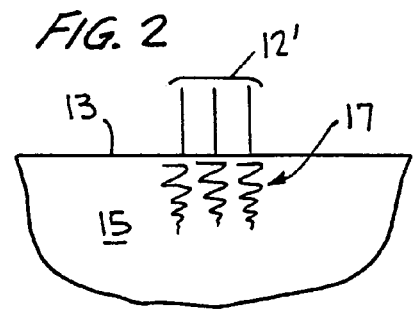
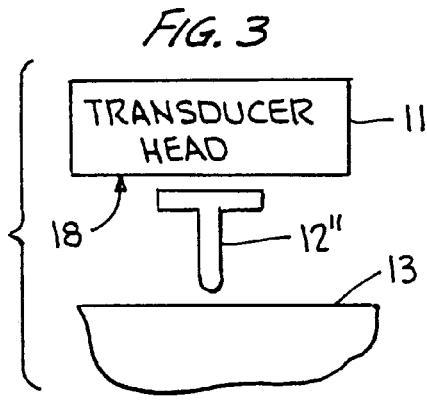
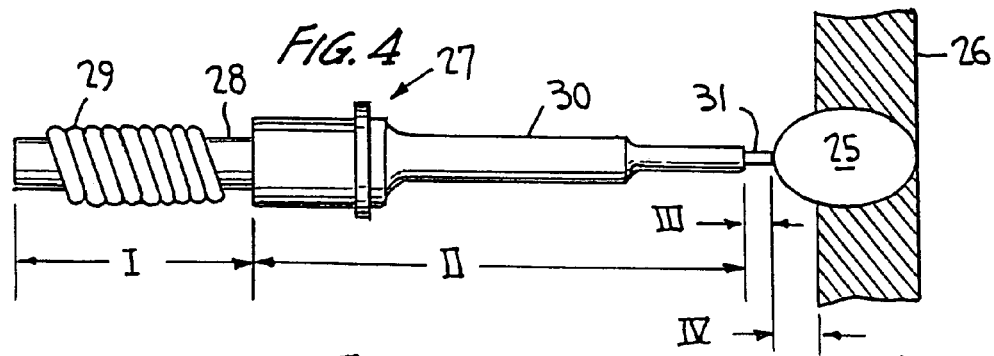
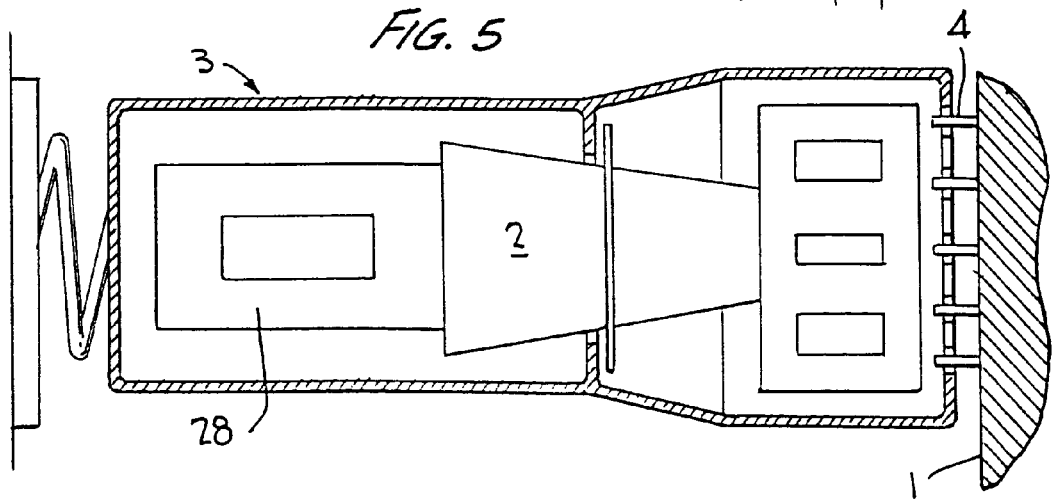

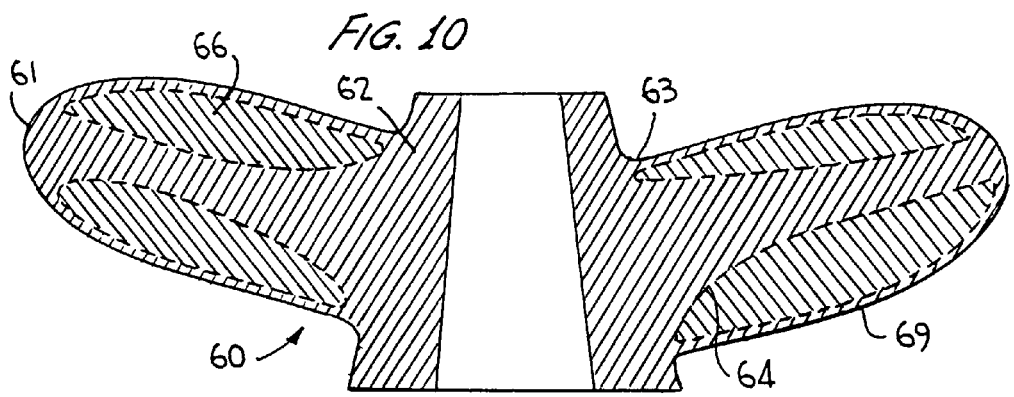
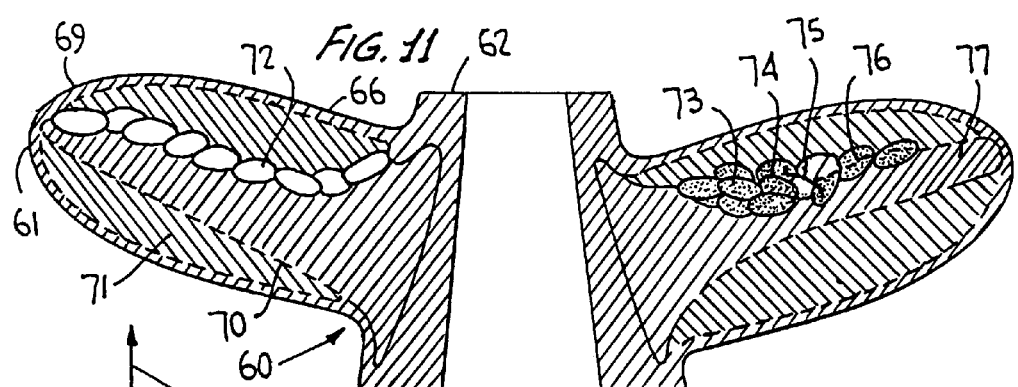
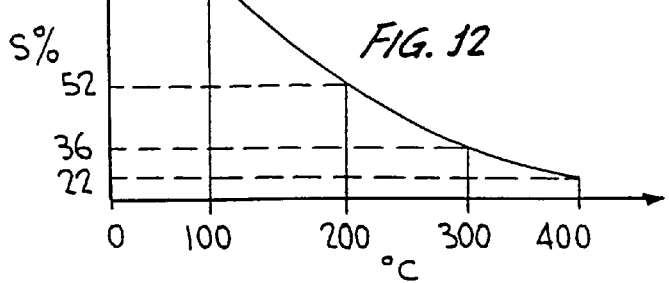
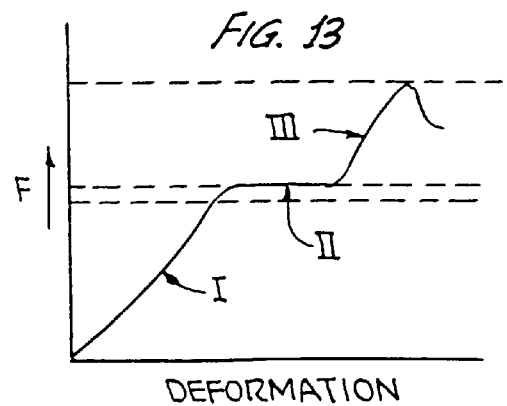
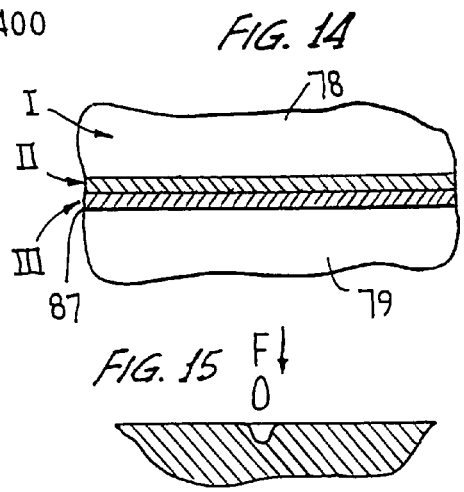

ULTRASONIC IMPACT MACHINING OF BODY SURFACES TO CORRECT DEFECTS AND STRENGTHEN WORK SURFACES

RELATED PATENT APPLICATIONS

This is a division of application Ser. No. 10/207,859 filed Jul. 31, 2002 now U.S. Pat. No. 6,932,876; which in turn is a continuation-in-part of U.S. application Ser. No. 09/273,769 filed Mar. 23, 1999, now U.S. Pat. No. 6,289,736, and U.S. application Ser. No. 09/653,987 filed Sep. 1, 2000, now U.S. Pat. No. 6,458,225 B1; the latter application in turn being a continuation-in-part of U.S. application Ser. No. 09/288,020 filed Apr. 8, 1999, now U.S. Pat. No. 6,338,765 B1; which in turn is a continuation-in-part of U.S. application Ser. No. 09/145,992 filed Sep. 3, 1998, now U.S. Pat. No. 6,171,415 B1.

FIELD OF INVENTION

This invention relates to methods of ultrasonic impact machining of manufactured metallic bodies of various shapes to strengthen the surfaces and correct external and internal manufacturing defects and in-service-generated fatigue defects, and related apparatus, ultrasonic transducers and treated metallic bodies.

More particularly, the invention relates to application of ultrasonic impact energy at various external surface zone treatment configurations of a metallic workpiece with sets of ultrasonically driven impact needles in an ultrasonic transducer configuration relatively movable to scan the external working surface of a workpiece body, such as a propeller, bearing or other machine part, wherein small diameter, freely-moving impact needles provide enough energy to modify parameters and properties of the surface, and deform and compress impacted surface areas and adjacent sub-surface regions to significant depths.

BACKGROUND OF INVENTION

The parent applications, which are incorporated herein in entirety by reference, relate to some of the ultrasonic system and method features herein disclosed.

Published background technology for the application of ultrasonic impact energy to the surface of polypropylene and thermoplastic materials for welding or riveting, is evidenced by U.S. Pat. No. 5,976,314 issued Nov. 2, 1999, by Manfred Sans for DEVICE FOR ULTRASONIC TREATMENT OF WORKPIECES. However, this teaching does not disclose a feasible system for the reworking of machined metal workpieces by ultrasonic impact machining methods wherein the machined metal surface and sub-surface thereunder is deformed to control surface texture and workpiece hardness, as does the present invention.

The application of ultrasonic energy to metal weld joints, as disclosed by S. E. Jacke in U.S. Pat. No. 3,274,033 issued Sep. 20, 1966 for ULTRASONICS, involves contacting an ultrasonically oscillating transducer horn directly upon a welded seam between abutting thin titanium alloy panels to process welding defects. However, this transducer horn system cannot deliver enough power to a massive metal workpiece body to effectively penetrate any considerable distance into sub-surface areas for deforming and compressing the surface and adjacent sub-surface regions and increasing the strength of massive metal bodies, such as cast iron used in various tool embodiments for compressive confrontation of mating surfaces.

Various specialty ultrasonic metal working impact tools, including hand operated transducers, are disclosed in the prior art for surface deformation and sub-surface plasticization of explicit shapes and contours, typically cylinders, rotating surface segments and planar sheets by direct mechanical interfacing of an ultrasonically vibrating head with a metallic surface work site. Typical disclosures are found in Russian Inventor's Certificates including: SU 1447646 A1, published Dec. 30, 1988; SU 1263510 A2, published Oct. 15, 1986; SU 1756125 A1, published Aug. 23, 1992; SU 1255405 A1, published Sep. 7, 1986; SU 1576283 A, published Jul. 7, 1990; SU 998104, published Jan. 5, 1981; SU 1214396 A, published Feb. 28, 1986; SU 1481044 A, published Sep. 28, 1987; and SU 1703417 A1, published Jan. 7, 1982 relating to direct mechanical contact between an oscillating ultrasonic transducer head oscillating at the prescribed ultrasonic frequency and the treated metallic object surface. These ultrasonic transducers in general dispose a single directly driven impact element coupled to a driving oscillator surface, which vibrates at a periodic ultrasonic frequency as applied to treatment of a welded structure to reduce welding defects.

French Patent No. 2,662,180 filed May 7, 1991 relates to a system for applying ultrasonically impulse energy for the special purpose of inducing plastic surface deformation at weld sites to correct welding defects in plastic materials. This prior art system, however, does not disclose satisfactory ultrasonic machining methods or systems or an ultrasonic transducer structure as afforded by the present invention or any structure or methods that could successfully develop and control ultrasonic energy intensity sufficient for general purpose ultrasonic impact machining by deforming both surface and sub-surface structure to a significant depth in a variety of working interface surface shapes of massive metallic bodies for compressively confronting mating surfaces.

Statnikov et al published documents IIW XIII-1617-96 and IIW XIII-1609-95 relate to the state of the art of hand held tools for applying ultrasonic impact energy directly from an oscillating transducer head at the impacting resonant frequency of the driving oscillator. These transducers are special purpose transducers with single impacting needles adapted to a system configuration for achieving the particular functional treatment of welded structure defects.

These prior art ultrasonic transducer systems have not provided satisfactory tools, systems or methods for reworking and machining metallic work interface surfaces of various shapes employed in frictional compressive and sliding contact, such as presented in rotary bearing surfaces, brake drums as well as sliding and reciprocating engine cylinders or wedges, propellers and the like, thereby to deform surface and sub-surface structure, hardness and texture for producing longer work life while bearing increased compressive work loads.

In general, the prior art ultrasonic transducer systems have not been able to provide high enough readily controlled impact power over work interfaces of considerable surface area on metallic workpiece interfacing surfaces to precisely control both the surface hardness and texture and the adjacent sub-surface structure at significant working depths exceeding normal wear tolerances. The prior art has produced ball peening and ultrasonic transducer impacting systems with enough power to reach the material's yield points for deformation treatment in the molten or plasticized state. However, this invention produces enough ultrasonic impact power to effectively reach the ultimate material strength of the body, and thus modify the surface layer.

Thus, such prior art systems and methods do not provide substantially universal ultrasonic transducer systems and methods suitable in size, power and control for achieving work functions, such as desirable for the repair or manufacturing of metallic work interfacing surfaces for compressive confrontation with mating surfaces. Nor is the prior art capable of plastically deforming and compressing surface and adjacent sub-surface regions to sufficient depths particularly for machining a variety of different surface configurations on massive metallic bodies thereby to attain specified end structure in both surface and sub-surface regions of a treated metallic workpiece. High power ultrasonic transducers also must be confined in size to machine internal cylindrical working surfaces of bearings, keyways and the like.

Also, the ultrasonic transducer must be of a nature to ultrasonically impact machine metallic objects of various interacting surface shapes to greater depths. For example, consider the problems of manufacturing and/or repairing a propeller having critical surface characteristics at blades, hubs and fillets of different shapes and masses, and being subject to various kinds of sub-surface defects, such as cavitation, corrosion, wear, cracks and welding stresses, which would deteriorate the reaction of marine propeller blade working surfaces in underwater compressive and sliding interface with saltwater. There has been no known successful multi-function system or method for ultrasonic impact machining of such diverse sets of conditions as incurred in the manufacture and in-service repairs of marine propellers.

The typical prior art manufacture and repair of marine propellers is expensive and complex and must employ a series of incompatible treatment methods, such as heat treatment of the metallic workpiece in a furnace, which cause defects which deteriorate the desired service as a marine propeller. Propellers are conventionally cast and left with sub-surface pores, cavities, cracks and geometric deviation from design shape. Manufacturing defects are detected by ultrasonic, X-ray, metric and other non-destructive tests. Conventional repairs are made by heat treatments and controlled cooling cycles, grinding, machining, welding depositions, and the like, which in turn introduce new stresses, fatigue and corrosive characteristics and are expensive and time consuming. In particular, the heat treatments are critical in the presence of transition surfaces, blade thickness variations, uneven mass distributions, etc. which tend to leave unevenly distributed thermal deformations and unfavorable residual tensile stresses that speed up corrosion, fatigue and wear failures in service, particularly in salt water environments.

It is also necessary to introduce various surface treatments after internal heat treatments, such as to supply protective coatings on propeller blades and the like, which in turn introduce surface imperfections that interfere with work surface operation. For example, required surface characteristics may range from in-service optical smoothness to specified degrees of surface roughness necessary to anchor an outer smoothing layer, and there has been no known prior art ultrasonic machining method or system for achieving this.

Thus, it is an object of this invention to ultrasonically machine workpiece working interface surfaces to achieve designated smoothness, hardness, surface deformation, surface relief, compressive stresses, friction, reflectivity and corrosion resistance and to remove surface and sub-surface defects.

It is a primary objective of the invention to employ ultrasonic impact surface and sub-surface plastic deformation tools, systems and methods for improving metallic workpiece surface strength while substantially reducing manufacturing procedures and costs.

Improvements of propeller reliability using ultrasonic impact machining is achieved by directing aperiodic force impulses on the workpiece surface with a freely axially moving impacting needle element driven from a primary ultrasonic energy delivery surface vibrating at the specified ultrasonic frequency.

It is critical in such operations to produce enough power for deforming surface and sub-surface regions of a workpiece to necessary depths. The present invention greatly increases output power by operation of a transducer driven from a periodic ultrasonic frequency energy source through a series of energy concentration stages operable at interfacing higher harmonic resonance frequencies operable at a Q-factor increase and significantly higher velocity imparted to needle-like freely axially moving impacting elements.

OBJECTS OF THE INVENTION

It is, therefore, a primary object of this invention to introduce novel multi-functional ultrasonic impact machining methods, transducers and systems for restructuring metallic workpiece working surfaces of various configurations during manufacture or repair.

It is a concurrent object of this invention to treat metallic workpieces in final stage manufacturing steps by replacing awkward and expensive furnace heating treatments with ambient temperature ultrasonic impact energy treatments at a workpiece surface, and to prepare with an improved transducer array metallic workpiece surfaces of different surface shapes for manufacturing steps for establishing specified modifications of surface texture and adjacent sub-surface regions introduced after conventional manufacturing procedures on metallic workpieces, such as grinding, weld depositions, alloying and deposition of protective coatings, etc.

Other objects, features and advantages of the present invention will be found throughout the following descriptions, drawings and claims.

BRIEF DESCRIPTION OF THE INVENTION

Novel ultrasonic impact machining methods and systems comprehensively treat both regularly-shaped, planar and irregularly-shaped metallic workpiece working surfaces by subjecting the machined surfaces to ultrasonic impact energy from high velocity, small diameter needle-shaped impacting members. Thus, critical working surface and adjacent sub-surface regions of metallic workpieces, including marine propellers, are plastically deformed to produce specified surface textures and hardness and associated sub-surface structural changes induced by surface impact. An ultrasonic transducer provides a periodically oscillating energy transfer interface to a set of small diameter impacting needles that freely axially move into impact at high velocity into the machined surface to release sufficiently high energy to deform the workpiece to greater depths than heretofore feasible. The impact needles of the set are individually impelled from a transducer oscillating surface operating at a single specified ultrasonic frequency to impact the working surface in a kinetic energy transfer relationship and rebound in an aperiodically controlled mode or randomly.

Impact power of small diameter needles moving independently from the driving transducer to the workpiece in a free axial mode of movement permits very high velocities and high energy derived from the transducer periodic ultrasonic power source. This results in enough impact power for both plastic surface and sub-surface structural reconfiguration of heavy metallic objects to significant depths. Because of the small impact area, short impact time, duty cycle and the heat absorbing characteristics of the metallic workpiece, surprisingly, during ultrasonic impact, the workpiece is rapidly heated and cooled at a localized area at the point of the impact and machined at ambient temperatures. The workpiece after machining remains then at an ambient temperature.

A transducer to workpiece interface is established by operation of sets of impacting needles which rebound from the work surface to the periodically ultrasonic oscillating driving anvil. This in effect produces a broad-band work interface characteristic that maximizes working power output transferred by the separate very high velocity needles instantaneously impacting the surface from the periodically oscillating ultrasonic power generating source in accordance with the advantageous kinetic energy impact relationship ($W=mv^2/2$) utilized by this invention. Thus, the kinetic energy delivered from the high velocity of the free flying impact needle, being a function of $v^2$, is much larger than possible with the direct impact of the transducer horn taught by Jacke and other direct transducer to workpiece interfacing systems of the prior art mentioned above.

The multiple increase of the oscillation velocity of impact needles at the instant of impact is due to the nonlinear relation between the oscillation velocity and the gap between the needle butt and the transducer head impact surface. Here the mass, "m", which determines the impact energy at a certain velocity, includes above all the mass of the transducer and the mass of the needle reduced to the butt of the needle.

Moreover, the impact includes the ultrasonic oscillations of the impact needle in the surface layer of the material being treated together with the ultrasonic transducer head impact surface during individual ultrasonic impact. Such ultrasonic oscillations in turn initiate in the treated material power ultrasonic waves propagation of which creates individual effects of reduction in deformation resistance and relaxation in the material being treated.

Thus, the depth of the ultrasonic impact treatment in this case is determined by energies of controlled ultrasonic impacts, ultrasonic deformations and ultrasonic waves that are initiated in the workpiece during interface of the ultrasonic transducer, impact needle and the workpiece.

Critical to the output power delivery is a series of mechanically interconnected serial stages in the working transducer assembly, which is small in size for portable and manual operations and thus adaptable to use in restricted spaces, for providing excellent power transfer efficiency from a basic periodic ultrasonic source of power. A series of interconnected transducer stages exhibiting respective mechanical resonances harmonically related to the primary ultrasonic oscillation frequency so that a much greater multiple of that primary ultrasonic frequency thereby imparts a very high velocity to the freely moving impact needles and further produce a Q-factor amplification of the oscillating system contributing to greater output power from the available oscillator input power. Also, for efficient transfer of power from the respective operating stages of the transducer, matched instantaneous resistances are provided at the instantaneous loading moment of operation when the freely axially movable impact needle elements are driven by the transducer oscillating surface vibrating at the primary ultrasonic frequency aperiodically into the surface of the workpiece.

This mode of operation provides the novel thermal treatment to the workpiece to plasticize the surface and sub-surface metal for the impact machining improvement of the workpiece work surface strength and operating performance in the presence of working compressive forces. Thus, the thermal machining in the plastic state with impact forces compressing the workpiece (e.g. a propeller) metal surface layer produces increased compressive working force capacity expended by compressively interfacing saltwater with mechanically moving surfaces e.g. propeller blade surfaces, and the operating life is lengthened.

A scanning system employing a lathe, surface scanning system, or the like, for systematically scanning a movable transducer head over a prescribed scanning pattern thus uniformly and in any specified way distributes the individual impacts from the impacting elements over selected workpiece surface zones, which may have different interconnected surface shape configurations depending upon the individual workpiece.

Accordingly, this invention provides novel ultrasonic oscillating elements and operating methods and novel ultrasonic impact machining modes for machining interfacing working surfaces of various kinds of metallic workpieces to effect plastic surface and sub-surface deformation resulting in structural changes, and increasing material hardness and service life.

These and other features and advantages of the invention will be set forth with particularity throughout the following description.

BRIEF DESCRIPTION OF THE DRAWINGS

In the accompanying drawings, similar reference characters found in the several views represent similar features to facilitate comparison.

FIG. 1 is a block circuit diagram of the ultrasonic impact surface treatment system of the invention.

FIG. 2 is a diagrammatic sketch of the manner of inducing compressive stresses at a working surface and immediate sub-surface region in response to a set of impacting elements.

FIG. 3 is a diagrammatic sketch illustrating generation of ultrasonic impacts from a free flying impact member obtaining one-sided impact driving energy by abutment from an oscillating ultrasonic transducer head to drive the impact member at high velocity as a freely moving object for impacting a working surface being ultrasonically machined.

FIG. 4 is a diagrammatic representation of a typical magnetostrictive ultrasonic impact transducer assembly embodiment interfacing the exterior working surface of a metallic workpiece.

FIG. 5 is a representative diagrammatic sketch of a cross-section of a multiple stage transducer terminating in a set of impacting elements, which are axially free to move at high velocity into a workpiece surface in response to periodic impact by the transducer interface.

FIG. 10 is a side view cross-section sketch of a propeller blade workpiece to be ultrasonically machined in accordance with this invention.

FIG. 11 is a side view cross-section sketch of a propeller blade diagrammatically illustrating regions to be subjected to ultrasonic impact plastic deformation to correct for manufacturing or service defects, in accordance with one embodiment of the invention.

FIG. 12 diagrammatically explains the effect on the material strength of a workpiece body during work under different temperatures.

FIG. 13 is a diagrammatic representation of a typical stress-strain curve for metallic components under stress.

FIG. 14 is a diagrammatic representation of the various levels of deformation introduced into the working surface of a workpiece as a result of the ultrasonic machining process of the invention. This represents two mating surfaces of a work body, the upper body treated to a certain depth by ultrasonic impact showing the effects of zones I, II and III, while the lower body is not treated.

FIG. 15 diagrammatically depicts the process of the impacting needle elements on the working surface of the workpiece during the machining process of this invention.

DETAILED DESCRIPTION OF THE PRESENTLY PREFERRED EMBODIMENTS

Figure 6:
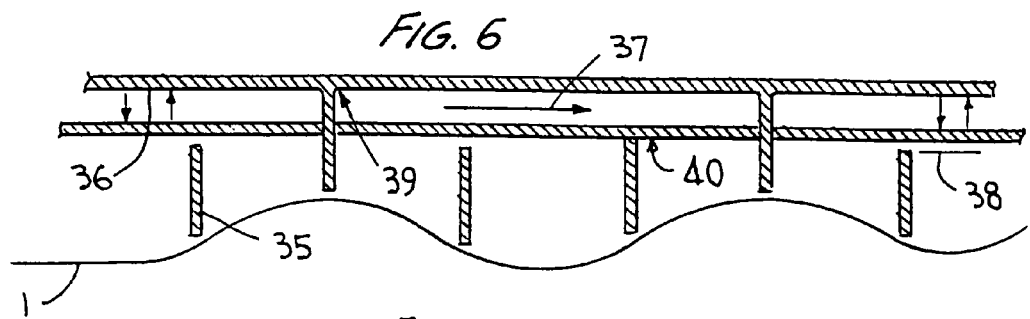
FIG. 6 is a diagrammatic sketch illustrating the impact interface of the freely moving needle impacting elements of a typical set with the periodically vibrating transducer driving surface to receive oscillation energy for delivery to and impacting the workpiece surface in a controlled and random aperiodic mode of operation.

With reference to FIG. 1 of the drawings, this block system diagram identifies the ultrasonic impact operating system for treating metallic workpiece surfaces, shown as work surface 13, by employing a set of ultrasonically movable impacting elements 12, presented typically as sets of three or four spaced members, for impacting the work surface 13 under control of the ultrasonic transducer head 11. The periodic pulse energy source 10, typically operable at ultrasonic frequencies up to 100 kHz, induces oscillations into the transducer head 11, preferably subject to feedback frequency and phase control 14 processing feedback from the working transducer head 11 to aid in matching resonance characteristics of the head when working on the work surface 13 in the manner more particularly set forth in the parent applications.

In FIG. 2, the impacting element set 12' creates at the work surface 13 and extending into the sub-surface region 17 of a metallic work body 15, plasticized metal permitting the surface texture to be machined and sub-surface structural modifications in the work body 15 material to be retained. This effect is diagrammatically shown at sub-surface region 17 as separate working regions for the three impacting elements of the set 12' deforming the sub-surface metal to a depth determined by the impact power of the individual impact elements in the set 12'. The resulting deformation, typically compressive stress patterns, are merged over the entire workpiece surface being treated by appropriate scanning of the transducer across the selected workpiece surface by a scanning mechanism, such as a lathe or a scanning mechanism of the nature described below and shown in FIG. 8.

Figure 8:
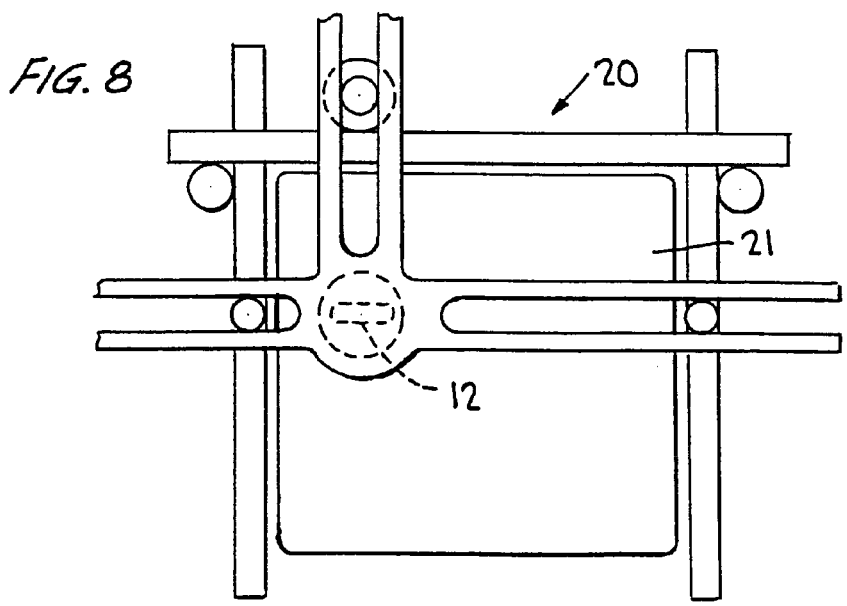
FIG. 8 is a sketch of a scanning mechanism for moving the ultrasonic transducer and accompanying set of impact elements over a selected workpiece zone in a manner producing a uniform pattern over the surface (the heat treatment of the workpiece not being shown).
Figure 9A:
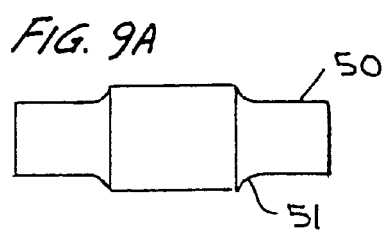
FIGS. 9A-9E illustrates a set of typical workpieces having working surfaces of varied surface configurations for providing compressive forces to mating surfaces that require ultrasonic impact machining in accordance with this invention for increasing work load capacity and reducing manufacturing defects.
Figure 9B:
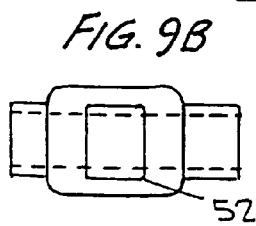
Figure 9C:
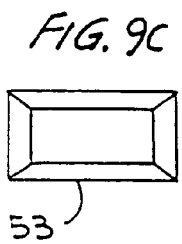
Figure 9D:
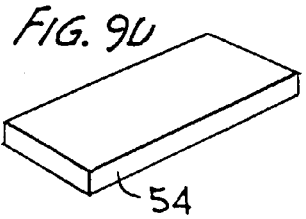
Figure 9E:
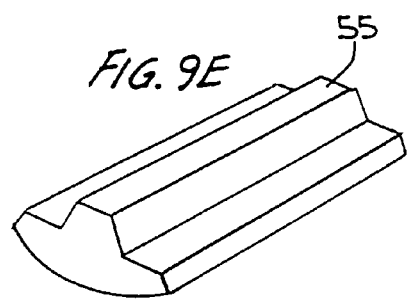

The scanning device 20 in FIG. 8 comprises a "universal joint"-type of mechanism for carrying a transducer with the set of impact elements 12 arranged to forcefully contact and scan a two or three dimensional workpiece surface treatment zone 21 in a regular pattern. The delivery heads of impact elements 12 deliver the required impact energy from the individual impact elements of the set to plastically deform increments of the metal workpiece which are integrated into a substantially uniform ultrasonic impact machining pattern across the scanning area for producing a predetermined combination of specified internal residual deformations, typically compressed sub-surface metal strengthening the metal for accomplishing its interfacing work function at a confronting work surface and tailored surface texture finishing characteristics. Those skilled in the art may automate the scanning procedure and provide selected scanning patterns depending upon the workpiece shape or functional operation in interfacing with a corresponding work surface or medium.

It is seen therefore that at ultrasonic frequencies up to 100 kHz with relative scanning of the impacting element set 12 about the work surface 13, at appropriate scanning rates, substantially uniform compressed surface structure and texture will be induced over the entire scanned treatment zone 21 (see FIG. 8), and the sub-surface metal will be compressed to a depth that exceeds the maximum wear expectations of the workpiece being processed. In this process, the ultrasonic impacts result in instantaneous high temperature with a rapid heating and cooling effect at the point of impact from individual impacting elements that plastically deform the surface to establish a surface texture and sub-surface compression layer that hardens in place uniformly across the work surface of the workpiece as the scanner moves and thus distributes the impacting energy over the workpiece work surface to machine the workpiece while in the plasticized state. This impact treatment zone 21 is characterized by residual compression stresses at the surface and in the adjacent sub-surface region, which are readily controlled to comply with the working specifications of various workpieces or workpiece regions by choices of oscillator energy and frequency, impact duty cycle, needle mass and velocity, and the like, thereby to produce specified surface texture and sub-surface deformation typically during reworking of cast and previously conventionally machined metallic workpieces in final manufacturing stages and repair or maintenance procedures encountered during the working life of the workpieces.

For achieving substantially greater transducer 11 to work surface 13 energy transfer and to control or randomize the time of impacts of individual impacting elements 12 on the work surface 13, the free axial movement mode of operation with freely axially moving impact member 12" characterized by the diagrammatic view of FIG. 3 is of significance in the present invention. Thus, the free flying impact member 12", by abutting the ultrasonically oscillating transducer head 11 impact surface 18, is impacted to receive kinetic energy and propel the impact member 12" at high velocity toward the work surface 13 as a free flying member to convert its kinetic energy upon the work surface 13, thereby releasing enough energy upon the work surface 13 to texture and compress that surface and adjacent sub-surface regions while the metal workpiece, is in its plastic state. The impact member after delivering its energy to the workpiece work surface 13 then rebounds off work surface 13 for a further energy receiving impact cycle with the transducer head impact surface 18. This results in controlled or random aperiodic impacts of the free flying impact member 12", which respond aperiodically to surface characteristics of the workpiece as the impact member 12" rebounds and contacts the transducer head impact surface 18 at various phases during the periodic oscillations of transducer 11.

As later discussed with reference to FIG. 6, the transducer and its set of freely axially moving impact needles individually driven from a periodically ultrasonically vibrating transducer driving surface produces greater needle kinetic energy than prior art transducers and transfers power to the independent impact member 12" randomly and aperiodically from the periodically vibrating ultrasonic frequency of the workpiece driving surface.

The multiple increase of the oscillation velocity of impact needles at the instant of impact is due to the nonlinear relation between the oscillation velocity and the gap between the butt of the needle 12 and the head of the transducer 11. Here the mass, "m", which determines the impact energy at a certain velocity, includes above all the mass of the transducer 11 and the mass of the needle 12 reduced to the butt of the needle.

Moreover, the impact includes the ultrasonic oscillations of the impact needle 12 in the surface layer of the material being treated 13 jointly with the ultrasonic transducer head 11 during individual ultrasonic impact. Such ultrasonic oscillations in turn initiate in the treated material power ultrasonic waves propagation which creates individual effects of deformation resistance reduction and relaxation in the material being treated.

Thus, the depth of the ultrasonic impact treatment in this case is determined by an energy of controlled ultrasonic impacts, ultrasonic deformations and ultrasonic waves that are initiated in the workpiece during periodic controlled or random contact of the ultrasonic transducer 11, impact needle 12 and workpiece 13.

This method of treatment of metallic working surface 13 thus permits work surfaces of diverse shapes, masses and surface characteristics with an ultrasonic transducer head 11 supplied with a set of ultrasonic impact members 12" impacting the workpiece at external surface locations then efficiently induces ultrasonic surface impact machining by deforming the surface and adjacent sub-surface region for achieving specified surface and sub-surface conditions including compression of the workpiece material for inducing greater hardness and longer life expectancy for subjecting the workpiece work surfaces to surface resistance, medium contact and wear encountered in designated work environment conditions of encountering mating surfaces in a compressive embrace.

The plan view transducer configuration of FIG. 4 looks downwardly toward the metallic three dimensionally-shaped workpiece 25, which typically presents a conventionally ground or machined surface texture and is retained in a suitable mechanical holder 26. The portable and free axially moving transducer 27 oscillates at a prescribed ultrasonic frequency from a remote oscillator energy source (10 in FIG. 1) by way of the magnetostrictive converter 28 with energizing coils 29, comprising a first sequential operating stage I. The intermediate stage II is preferably a re-placeable waveguide 30 for concentrating the incoming ultrasonic energy vibrations of a particular frequency to impact and drive the indenter element(s) 31 of the third stage III, which in turn ultrasonically plasticizes and compresses the metallic workpiece 25 (stage IV). Preferably the indenter element(s) are sets of needles operating in the mode illustrated in FIG. 3 for assuring sufficiently high velocity impact energy to control sub-surface workpiece structure to significant enough depths to improve the output strength of the particular workpieces being processed.

Thus, this invention comprises a multi-stage transducer array terminating in an impact delivery head driven by an ultrasonically oscillating transducer power delivery stage through an abutting intermediary waveguide transformation stage. The impact producing stage elements, preferably comprise a set of freely axially movable impacting elements which individually randomly and in a controlled aperiodic mode convert the instantaneous periodic delivery of energy from the ultrasonic energy driving system to impact individual elements in the set when striking the workpiece surface to deliver their energy derived from the oscillating transducer power source. These impacting elements then rebound to engage the transducer for delivery of a subsequent energy stroke from an abutting periodically oscillating transducer energy delivery interface surface in a random or controlled phase of its oscillation cycle. In view of different lengths of movement of the freely axially movable impacting needle elements of a set between the transducer energy delivery interface surface and the workpiece surface to occur at different oscillation phases, and subject to the topography of the workpiece surface, the individual striking needles of a set act independently and not in periodic unison for delivery of the transferred energy from the impacting elements to the workpiece surface.

The efficiency of the transducer devices as referenced in FIGS. 4 and 5, and their methods of use for achieving necessary energy to plasticize and compress metallic workpieces is dependent upon efficient and coordinated interfacing of several transducer stages to transmit ultrasonic oscillations between the energy producing ultrasonic generator and to concentrate available oscillator energy onto the impact needle elements for striking and plasticizing the metallic workpiece at an external surface work zone. Thus, the transducer configuration is critical.

For example, the structures of the transducer assembly multiple stages I+II, III, and IV in FIG. 4 and equivalent stages 2, 4 and 1 in FIG. 5, all have inherent natural mechanical resonance response characteristics. Thus, in accordance with this invention, the various transducer stages are tailored to present resonance frequencies related to the fundamental ultrasonic oscillation frequency produced at the magnetostrictive converter 28. In this respect, the natural frequency of stages II, III and IV of the FIG. 4 transducer assembly and corresponding stages 2, 4 and 1 of the FIG. 5 transducer assembly are individually tuned to a natural resonance frequency which is a multiple of the fundamental ultrasonic oscillation frequency. This concentrates the oscillating velocity to the impacting elements and vibrates them at a much higher speed so that the energy of oscillation transferred to the impacting needles is maximized. Consider that when the resulting working frequency of the impact needles is at harmonic frequencies much higher than the basic ultrasonic oscillator frequency this imparts a higher impact needle velocity v, and makes the $v^2$ kinetic energy component of the impacting element deliver enough energy to plasticize the surface material of the workpiece to a significant working depth below the impact surface and compresses the workpiece body at an energy level equal to or above the ultimate material strength.

Further, the transducer stages are designed with the instantaneous acting resistance of the separate stages at the instant of contacting an indenter element for a power impact cycle which is related to both the instantaneous stresses in the various stages (U) and the instantaneous oscillating velocities (V) reduced to the contact points of the indenter elements by the ratio U/V, which is equal for each stage. This assures effective maximum power transfer of the energy of oscillation from stage to stage.

With reference to FIG. 5, the resistance of the various stages are equalized as expressed in the following equation: R=U1/V1=U2/V2=U3/V3=U4/V4. This invention, therefore, contemplates establishing an instantaneous active resistance R when the impact energy delivery head contacts an indenter element substantially equal to the instant active resistance at the respective individual multiple stages.

In FIG. 5, the oscillating system presented thereat includes: tool 3 with transducer and oscillating velocity transformer 2, indenter elements 4 and workpiece 1. An energy balance in such a system is determined by the equality of kinetic energy at the output of the system and the potential energy stored by the workpiece due to plastic deformation of its treated surface, ultrasonic deformations and relaxation of the workpiece material in the ultrasonic wave as described above. Generally and functionally, the equation of the energy balance can be written as follows:

$$M3(V3)^2/2+M4(V4)^2/2+M1(V1)^2/2=C1(X1)^2/2,$$

where

M (1, 3 and 4) are the respective equivalent masses of the workpiece, tool and indenter elements reduced to the impact points on the workpiece surface;

V (1, 3 and 4) are the respective maximum oscillating velocities of the workpiece, tool and indenter elements in the impact points on the workpiece surface;

C1 is the equivalent elastic factor of the workpiece reduced to the impact points on the workpiece surface;

X1 is the equivalent elastic deformation of the workpiece caused by equivalent plastic deformations of the workpiece, ultrasonic deformations and relaxation of the workpiece material in the ultrasonic wave initiated in the workpiece by the ultrasonic impact.

It should be noted that each indenter element of FIG. 5 excites oscillations of a new "added" mass in the workpiece, thereby increasing the equivalent mass M1, and hence the kinetic energy is reduced to the point (points) of the impact (impacts). According to the energy balance equation, increase in kinetic energy of the impact (impacts) results in the increase of the energy induced to the surface and the material of the workpiece, which in turn is equivalent to the potential energy stored by the workpiece during ultrasonic impact. The results obtained from the given process include: increase of treatment depth, increase of induced compressive stresses and their level in the region of the material ultimate strength, optimization of the phase and crystal structure of the workpiece material, a spatial component of regular macro- and micro-relief of the treated surface.

Now with further reference to FIG. 5, identifying the overall movable transducer casing 3, including the force of the spring urging the transducer into the work surface, the transducer assembly 2, the indenter elements 4 and the workpiece 1, the various coordinated oscillating systems are employed to attain appropriate designated ultrasonic impact of the surface of the workpiece 1 uniformly over a scanning pattern while achieving controllable surface smoothness, hardness, compressive stresses and surface shaping as well as corresponding sub-surface removal of defects including the replacement of residual tensile stresses with compressive stresses and corrective machining, etc. as achieved in the plasticization procedure induced by the impact treatment.

Thus, by establishing in a multi-stage transducer array of a set of interfacing stages having respective natural resonance characteristics harmonically related to the ultrasonic frequency from the driving energy from said energy driving system, massive metallic workpieces can be plasticized below the surface to achieve designated specifications, particularly with respect to the repair of manufacturing tool marks and other residual defects. This invention provides improved ultrasonic impact methods for plastically deforming the sub-surface metal, preparing the workpiece surface zone texture for such tasks as receiving a protective coating, or for introducing specific surface and sub-surface macro-relief and micro-relief surface texture patterns, plastically deforming the sub-surface metal to eliminate inter-granular irregularities, plastically deforming and compressing the sub-surface metal to conform the surface configuration of the workpiece to selected specifications, plastically deforming the sub-surface metal to compress a workpiece surface layer to a significant depth and to preserve residual compressive forces introduced by such treatment, to increase dimensional stability, fatigue, dynamic and thermocyclic life, and other induced modifications of massive metallic workpieces of the nature hereinafter set forth in specific examples.

In FIG. 6, the diagrammatic showing of the indenter elements 4 of FIG. 5 encompasses the freely axially moveable impact members 12" discussed in connection with FIG. 3. The manner in which these sets of indenter elements achieve random or controlled aperiodic energy delivery impacts upon the workpiece surface 1 when indenter elements are driven by a transducer impact surface 36 and can oscillate between the impact surface 36 and the workpiece surface 1 at a periodic ultrasonic frequency much higher than the basic ultrasonic power oscillation frequency is illustrated. Thus, a selected individual indenter element 35 is shown in its freely movable axial mode for receiving kinetic energy during the impacting operation induced by the abutting oscillating transducer surface 36, which vibrates between the upper two horizontal lines as the workpiece is scanned by the transducer head in the direction of treatment 37. The indenter element 35 is shown in various phase positions relative to the periodic driving source as the transducer travels to the right in the direction of treatment 37 along the workpiece surface 1 in response to the various positions of the transducer surface 36 and the topography of the workpiece surface 1. At 38 the indenter element is shown in free flight after contact with the workpiece surface 1 to deliver its kinetic energy after its excursion induced by contacting the transducer surface 36, at a phase between vibrating limits 39 and 40 for different vibrating positions or phases of the transducer abutment surface 36. In abutment with the oscillating transducer, the indenter element 35 at vibrating limit 39 receives energy transfer from the ultrasonic energy source driving transducer. It is, therefore, seen that the indenter element 35, depending on the boundary conditions on the surface 36, may vibrate both controllably and randomly, but aperiodically even though the transducer driving output surface only periodically vibrates. In this manner, the indenter element 35 strikes the workpiece surface 1 randomly or controllably to deliver its energy and thereafter rebounds from the workpiece surface 1 at instants determined by relative positions respectively of the oscillating transducer surface 36 and the macro- or micro-relief pattern exhibited on the workpiece surface 1. This feature thus introduces a novel mode of ultrasonic impact machining of heavy metallic workpieces, which is controllable in nature and therefore applicable to diverse workpiece surfaces and different workpiece masses, surface characteristics and workpiece shapes as ultrasonic impact energy is delivered by individual indenter elements 35, etc. within the set of indenter element array 4.

Figure 7:
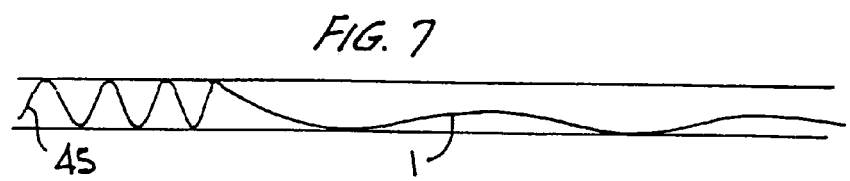
FIG. 7 is a diagrammatic sketch in cross-section of a workpiece surface being scanned by impact needles and deformed while in a plastic state by impact tips of the needles during direct contact with an ultrasonic impact transducer head and after impact of the transducer head upon the needle in accordance with the invention in the process of plastically deforming and restructuring the workpiece surface.

Now with reference to the diagrammatic view of the workpiece surface 1 in the machining process of the invention as exemplified in FIG. 7, the ripples 45 represent an initial state presenting tool marks on the surface being treated before ultrasonic impact machining plasticizes and smooths the surface 1 of the workpiece, typically carrying residual tool mark defects encountered in manufacturing steps, such as tooling or grinding the workpiece surface. The resulting plasticized workpiece surface 1 in the ultrasonic impact treatment process of the invention displays a micro-relief or macro-relief pattern provided by plasticizing the workpiece metal on the surface at a selected contact zone and extending into its associated sub-surface region respectively resulting in either plastically smoothed or roughened workpiece surfaces and a compressed sub-surface workpiece layer extending to a depth greater than the designated wear depth of the workpiece surface being machined.

It is significant here that the resulting workpiece will be hardened above its yield point and substantially to its ultimate strength extending through the sub-surface depth being treated, as more specifically set forth in the parent application Ser. No. 09/653,987 directed to the specific embodiment of drum braking systems. Also it is significant that the workpiece is machined at ambient temperatures, made possible by the instantaneous nature of the impact by the impact needles over a small surface of the workpiece body area at a duty cycle such that the thermal energy is quickly absorbed in the workpiece body as a heat sink, to thereby permit ultrasonic machining of a workpiece at substantially ambient temperatures.

In FIGS. 9A-9E, various typical metallic workpiece surface shapes for mechanically interfacing in a designated work function with other surfaces and media in operation are shown. These workpiece working surfaces are typically subjected to surface resistance; medium contact; fatigue and wear when exposed to designated work environment conditions as machine elements, structural elements and the like; and compressive forces when interfacing with a mating surface. The ultrasonic impact deformation machining method as provided by the invention for achieving a provides the required level of local thermo-mechanical effect on the material structure necessary to establish specified levels of resistance to frictional wear, contact fracture, cyclic failure, thermo-cyclic fatigue, corrosive fatigue, magnetization and undesirable shape deformation. This is realized by achieving specified and improved hardness, roughness, residual stresses, contact strength, fatigue limits, friction factors, reflectivity and corrosion resistance. The employed technical operations of the present invention include thermal processing, placticization, and compression of an outer workpiece metal layer by these ultrasonic machining impact procedures for heat treatment, surface alloying or other changes of texture and characteristics of surface materials, for example, establishing protective coatings with specified surface texture including polishing and burnishing, and removal of resident defects. We have determined that the ultrasonic impact machining methods of this invention provide, through plasticization of the workpiece metal in response to ultrasonic impact surface treatment and compression, a novel surface layer and adjacent sub-surface region extending to greater depths to substantially realize the ultimate workpiece body strength, and thus significantly improve service life over the prior art methods, such as ball peening, which cannot realize a workpiece body strength greater than the yield point at which the metal is plasticized.

Thus, this invention provides improved methods of treating metallic workpiece working surfaces of diverse shapes and masses, such as shown in FIGS. 10 and 11, with a set of ultrasonic impact elements treating the workpiece at external surface zones to induce surface and sub-surface modifications, thereby removing structural defects and achieving specified surface zone conditions, work interface surface hardness and longer life expectancy of the workpiece under service conditions of forceful surface to medium or surface to mating part compressive forces in either static or sliding contact conditions and interfacing with other external deterioration forces including corrosion and thermo-mechanical fatigue, for example.

The representative surfaces illustrated in FIGS. 9A through 9E show several examples of the work interface surfaces for encountering mating surfaces in a compression and sliding mode of action that are addressed by this invention, including cylindrical surfaces, such as rotary bearing surfaces 50, fillets 51 and flat spots 52 representing clutching surfaces, which may be superimposed adjacent to or upon the cylindrical surface shapes. Flat surfaces with tapered edges 53 as found in wedges, dowels and gibes and flat sheets 54 representing other types of surface structures used, for example, as structural girders encountering static residence compressive forces such as vibration, loading and corrosion. The working surface encounters local thermo-mechanical plasticization to modify the surface texture and to extend into compression layers to produce greater surface strength induced by ultrasonic impact machining methods of this invention. Also workpieces of complex shapes, such as machine parts, guideways 55 and propellers as shown in FIGS. 10 and 11, offer different curvatures, masses and angular projections at interfacing work surfaces, which may be subjected to thermal plasticization and ultrasonic machining by the improved ultrasonic transducer and impact methods of this invention.

The propeller workpiece of FIGS. 10 and 11 is presented as a workpiece embodiment of the invention exhibiting various surface configurations which are subjected to illustrate various initial conventional machining operations in initial manufacturing steps, which are machined in the final manufacturing stages by the ultrasonic impact methods of this invention. This type of metallic workpiece object is machined by ultrasonic impact surface machining that induces surface and sub-surface plasticization and compressive forces to control the surface and sub-surface texture and interface strength beyond the yield strength of the workpiece body metal approaching the ultimate metal strength. The machined workpiece surfaces are characterized by a distributed pattern of compressed indentations at the impact element contact areas.

Referring now to FIG. 10, the propeller 60, which constitutes a metallic casting, is shown diagrammatically in cross-sectional view with blades 61 extending from the hub 62. The fillets 63, 64 that appear on the rear surface are identified by the respective dotted line pairs. The main blade portion is shown in FIG. 11. The alternative dotted hatching pattern 66 represents areas reworked in the manufacturing process where defective portions are removed by grinding before heat treatment and weld repairs 71 and surface coatings 69 are introduced, for example in prior manufacturing steps. Residual defective and weak portions are, in accordance with this invention, machined by ultrasonic local thermo-mechnical surface impact treatment of superior magnitude, which plasticizes and compresses an outer layer of the workpiece metal surface including adjacent sub-surface areas.

The improved methodology of this invention thus is employed, for example, to rectify defects caused by weld repairs, internal voids and cracks, thermal and corrosive deformation gradients of the base metals and propeller blade, by machining fillet and hub shapes and surface configurations to replace conventional manufacturing steps and heat treatment operations. The ultrasonic impact thermal treatment of this invention is attained at ambient workpiece temperatures to redistribute compression stresses and eliminate tension stresses incurred in rectification of the above-mentioned defects by welding, grinding and shaping of the propeller surfaces while reforming the surface texture and compressing the metal in an outer layer of considerable depth to provide greater strength and longer life. The stress gradients at welds and boundaries between propeller structural components of different configuration imposed by manufacturing impact treatment steps to localized thermo-mechanical treatment thus are processed to rectify propeller defects and increase operational strength. Propeller reliability is increased by the methodology of this invention by decreasing motion resistance strength in water, reducing cavitation defects and increasing fatigue resistance, maximizing corrosion fatigue strength and equalizing the strength between propeller components, such as the blades and the hub. Also the surface treatments afforded by this invention improve corrosion resistance in the presence of saltwater and reduce parasitic blade oscillations under variable amplitude hydrodynamic loading conditions. The metal strength of the work interface is substantially increased to withstand compressive forces up to the ultimate workpiece metal body strength. Furthermore, this methodology when introduced in the final manufacturing stages reduces manufacturing complexity and tooling costs, thus significantly decreasing propeller manufacturing and repair costs over the conventional processing methods of the prior art.

This prior state of the art for solving propeller endurance problems, including heat treatment processes, has been outlined, for example, by N. N. Sokolov et al, *Stainless Steel Propellers*, Sudpromgiz, Leningrad 1960; Solokov et al, *Propellers in Aluminum Bronze*, Sudostroenie, Leningrad, 1971; and I. I. Bogoraz et al, *Propeller Manufacture Reference Book*, Sudostroenie, Leningrad, 1978. Strain hardening methods, such as hammer and shot peening, applied to the surface of blades, fillets and a hub are found in I. I. Bogoraz et al, *Propeller Manufacture Reference Book*, Sudostroenie, Leningrad, 1978; and E. V. Zvyagintsev et al, *Controllable Pitch Marine Propellers*, Sudostroenie, Leningrad, 1966. These methods produce compressive stresses on the propeller surface. However, by their physical nature are devoid of treatment parameter control technology, which can give a specified surface smoothness so important on the propeller propulsion surface.

This invention using the ultrasonic impact technology set forth in my document IIW Doc. XIII-1857-99, Lisbon, 1999 is based on the improvement of transforming harmonic oscillations of an ultrasonic transducer into controlled aperiodic impulses of force on the surface being treated. This can be accomplished with low energy intensity not more than 2000 W, high specific power, not lower than 300 W/cm$^2$ with mobile equipment, with a tool weight depending upon transducer frequency and power, between 200 g to 2.5 kg in the frequency range from 44 to 27 kHz. These improvements also permit fine adjustments and automated controls of treatment parameters, impact intensity and treated surface quality.

Some of the main characteristics of propellers, as primarily governed by conditions and properties of surfaces of the blades, hub and fillets, when intended to operate in an aggressive and harsh saltwater environment include: motion resistance in water, cavitation strength, fatigue resistance, corrosion control, equalized strength of blades and hub, reasonable costs for manufacture and repair, etc. The range of defects to be treated and repaired include: sub-surface pores, shrinkage and blowholes, inter-granular cracks and hairlines, geometric deviations from the design shapes and size of blades fillets, hubs, etc. Well-known conventional prior art techniques remove the above defects by machining, arc welding, subjecting to machining followed by furnace heat treatment at the thermal tempering temperature of no lower than 600° C. for not less than 6 hours. This invention rectifies all of those defects of machining followed by welding using ultrasonic impact treatment. In this case, the furnace heat treatment step is omitted and energy saving of no less than 10,000 kW per each propeller is achieved with a blade diameter more than 3 m. Propellers ranging from spans of 300 mm to 12,000 mm or larger need to be handled. Defects in the vicinity of fillets and sharp direction changes are ideally treated with light mobile impact transducer tool assemblies such as set forth in FIG. 5. Mechanized scanning means such as shown in FIG. 8 assure uniform ultrasonic impact treatment of selected treatment zones and are adaptable by those skilled in the art for associated automated timing and energy control systems responsive to the workpiece nature, shape and objectives of the thermal treatment, which is successfully replaced by ultrasonic impact treatment.

Now, as will be seen by specific reference to the propeller in FIG. 11, wherein defects have been determined by ultrasonic, X-ray, fluorescent and/or other non-destructive and introscopy tests following conventional manufacturing steps of coating, heating, grinding, machining, welding and removal or deposition of propeller body metal, the usually portable ultrasonic impact transducers are employed for ultrasonic local impact thermechanical plastification of the surface and sub-surface regions of a treatment zone to remove defects, produce specified surface texture and strength and improve performance life of the propeller in service.

The conventional prior art heat treatments of the entire propeller body in a furnace subjects the various masses, shapes and region boundaries encountered in a propeller to different residual stresses and thermal deformations which impair the propeller performance in both long time and short time desired service functions. The prior art step of grinding of propeller surfaces, not only creates undesirable surface roughness characteristics and also establishes unwanted surface tensile stresses thus causing natural surface damage, which invites corrosion under action of variable amplitude hydrodynamic loading in the presence of saltwater. This deficiency is corrected by the present invention by producing a plasticized controllable surface condition by ultrasonic thermomechanical impact of sets of impacting elements controllably as well as randomly and aperiodically striking the surface as it is scanned over a given treatment pattern in a given treatment zone.

Thus, in FIG. 11, the propeller 60 presents blade 61, hub 62, and fillet (63, 64, FIG. 10) surfaces of different masses and shapes that may be subjected to ultrasonic impact treatment both in surface and sub-surface regions of the blade using the above-mentioned transducer (tool) and in accordance with the methodology of this invention. The propeller 60 thus, is also representative of other metallic workpiece bodies having various shapes and mass distributions and displaying surface zones presented for forceful interfacing with other media or metallic bodies of the nature set forth in FIG. 9, for example, thereby to establish specified levels of resistance to frictional wear, cracks, fatigue failure, corrosion, tensile stresses and surface irregularities. The surface zones of these metallic bodies are thus scanned with sets of impact needle indenters having freedom of individual relative axial movement over a specified range of movement in response to abutment with an oscillating ultrasonic transducer energy driving surface to induce the increased magnitude of kinetic energy necessary for plasticizing and compressing surface and sub-surface regions of the metallic body to significant depths thereby to control surface shape, roughness, hardness, compressive stresses, contact strength, fatigue limits, grain structure, corrosion resistance and to eliminate sub-surface defects. These needle impact elements thus operate in the mode of operation illustrated by FIG. 6.

Thus, the present methods of ultrasonic impact plasticization of a metallic workpiece body produce the required energy to metallic body surface from an energy producing ultrasonic oscillating system thus to forcefully abut a set of impacting elements onto a workpiece surface zone at high velocity. The translated energy is readily controlled to meet specified results with appropriate masses and velocities of the impacting needles, the ultrasonic frequency and amplitude, etc. The preferred embodiment is characterized by an interfacing energy transducer presenting a physically interconnected series of coordinated serially disposed interfacing sub-systems as hereinbefore described. These sub-systems each have individual natural resonant characteristics chosen as a multiple of the specified single primary ultrasonic frequency from a pulse energy driving source thus by action of induced natural resonant oscillations from the available ultrasonic energy source significantly increasing and concentrating the output energy available for delivery to the set of impacting elements at the surface of the workpiece being machined.

Individual indenter elements with axial freedom of movement located in the transducer head indenter set, when thus oscillating in response to abutment with a transducer energy driving surface oscillating at the primary ultrasonic frequency, thereby impact the surface of the workpiece in a controlled and random asymmetric pattern with enough energy to plasticize sub-surface metal regions in the workpiece bodies. This treatment of the workpiece surface in a novel manner produces either smoother or rougher surface characteristics as desired during the plasticization phase of operation. Sub-surface treatment, followed by hardening of the plasticized workpiece treatment zones, preserves important compression force characteristics and presents a compressed metallic surface layer for encountering forces exceeding the yield strength of the workpiece metal, such as cast iron. Different elements of the workpiece, joined for example by fillets, are compatibly treated to reduced stress conditions for improving the workpiece performance and life.

These features and advantages of the invention are related in particular to the specific propeller 60 of FIG. 11, wherein the "as-cast" main section 70 of the propeller blade 61 has been filled with added metal 71, such as by weld deposition 72. This leaves undesirable internal tension stresses near the weld joint interfaces which are alleviated by the ultrasonic plasticization impact machining methodology of this invention applied to selected propeller blade surface zones after the welding and grinding operations are performed in a conventional manner.

As mentioned above, this invention allows omitting propeller heat treatment applied after welding areas of removed defects, provides for relaxation and reduction of welding residual stress level, propeller dimensional stability in service, geometrical accuracy specified by the drawing, and increases fatigue and corrosion resistance.

Blowhole defects 73 appearing in the restructured original casting are eliminated by machining followed by welding and treatment of the deposited metal by the ultrasonic plasticization impact machining methodology of this invention. Similarly, pore clusters 74, inter-granular cracks and interface defects 75, welding seam defects 76, and integration of casting interface surfaces with added material 77, are machined by the plasticization of sub-surface regions with surface-induced ultrasonic impacts delivered randomly by a set of individual freely axially movable impact needles. Thus, residual welding stresses are relaxed by the surface impact of the set of controlled and randomly striking freely axially movable indenters in the vicinity of the welded zones, as provided by this invention. Also, the interfaces of blade, hub and fillet surfaces are treated to relax residual manufacturing stresses and to produce a requisite more corrosive resistant surface, for example by producing a higher strength compressed surface and sub-surface outer layer.

Now the more general nature of the machining process of this invention and of the machined product produced thereby is set forth. Thus, reference is made to the strength-strain diagram of FIG. 12 representing the dependence of the plastic zone upon temperature for cast iron metal workpieces when loaded during their designated service, for example, during compression for a rotatable bearing, and when the base metal of the workpiece is processed by the ultrasonic machining methods of the invention. The material yield strength S for different temperatures are shown on the curve. Thus, at 100° C., the yield strength of the working material decreases to 73% of the material yield point at ambient temperature (20° C.). It is then of significant advantage to machine the workpiece metal at ambient temperatures as achieved by this invention, to be addressed in more detail later with reference to FIG. 15.

With reference to FIG. 13, the classical stress-strain curve for workpiece material is illustrated with stress force F indicated on the vertical axis and deformation indicated on the horizontal axis. The curve represents three zones of deformation (I, II, and III) that are pertinent to the machining and service operation of the workpiece surfaces subjected to compressive and sliding forces when interfacing mating surfaces. This ultrasonic machining process imparts deformation to the surface in the zone closest to the ultimate strength of the metal material which is depicted as zone III on the curve by compressing the metal, whereas prior art methods, such as peening, work at the plastic state of the working piece metal, namely the zone II lower magnitude yield point.

In FIG. 14, two mating surfaces 78 and 79 of a metallic workpiece are depicted wherein the various levels of deformation introduced into the workpiece surface 78 following treatment under the ultrasonic impact machining process of the invention are diagrammatically shown. The mating surface area or abutment area 87 is placed under load during the designated service of the workpiece. Accompanying sub-surface layers are indicated by the zones I, II and III. It is significant here that the work surface of the treated metal is compressed and therefore resides in zone III approaching the ultimate strength of the base metal of the workpiece body. Beneath this outer protective high strength layer of compressed material is a layer of material deformed at its yield point in the deformation zone II of FIG. 13. The elastic region of the workpiece body remains in zone I of FIG. 13.

Thus, as diagrammatically set forth in FIG. 14, a compressing force applied by the high kinetic energy needle indenters of the invention produces a surface strength in the maximum material strength zone III during machining of the workpiece, and conforms the cast iron workpiece, obtained in the plastic state II, to a work surface having a stronger compressed surface layer for confronting the workpiece mating part in a compressive and usually sliding contact mode. This results in higher bearing forces and longer life workpieces.

To achieve this result, as depicted in FIG. 15, a small area impacting needle element striking and compressing a work surface at a high velocity is employed in the ultrasonic impact machining methods of the invention.

From the deformation characteristics of FIG. 13, the first plateau is formed when impacting forces reach the material yield point of zone II forming plastic indentations of the workpiece material.

Contrast that with the zone III area where the ultrasonic impact machining method of this invention introduces deformation on the workpiece surface layer resulting in a strengthened compressed workpiece work surface layer up to 2 mm deep at a point close to the range 0.9 to 0.95 of the maximum cast iron material strength to achieve a substantial improvement in compressive work forces feasible, and results in elimination of prior stress concentrations at that surface and the reduction of crack development in service. Here the total depth of the layer, which includes the above-mentioned strengthened layer, elastic compressive stress layer and the layer relaxed by the impulse and ultrasonic stresses, extends to a depth in the order of at least 12 mm thus to afford extended life over expected wear depths specified for the workpiece, such as a bearing or brake drum. When the ultrasonic impacts are applied by scanning the entire work surface of the workpiece with the impact needles, this improved method assures a uniform surface texture on the surface ranging from a surface slightly roughened with a micro texture for adhering to a coating material to one of substantially optical smoothness, as desired for propeller blade workpieces for example. The prior art peening methods of surface treatment form areas of plastic deformation with induced compressive stresses not greater than material yield strength to depths of about 2 mm and, therefore, cannot significantly improve the wear life of the workpiece at the level obtained by the combined effect of the ultrasonic impact and a wave with induced compressive stresses equal to the ultimate strength of the treated material, their elastic and relaxation influence on the material condition up to 12 mm from the surface in accordance with this invention.

The ultrasonic impact machining methods of the invention thus enhance frictional wear properties, performance and life of rotary bearing surfaces, which can be readily machined by transducer driven impacting elements and machining systems afforded by this invention to improve the life expectancy of particular workpieces. The ultrasonic impact energy is applied at an intensity level sufficient to induce a surface and sub-surface deformation pattern that produces increased strength in the surface layer and balanced distribution of forces in the zone I elastic volume of the basic workpiece body material (FIG. 14) that together with an outer textured surface suitable for the workpiece in its specified service decreases thermo-mechanical fatigue and scuffing or heat checking under conditions of dry sliding contact and frictional loading at the work surface.

Figure 16:
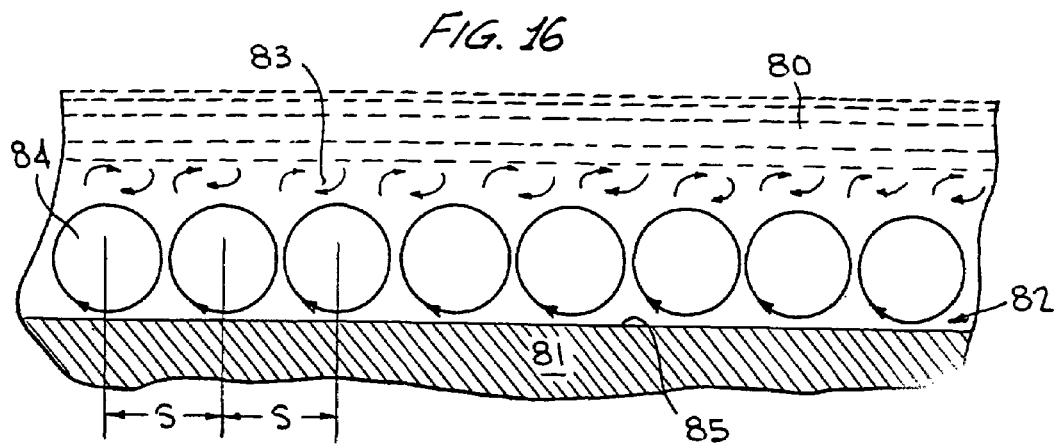
FIG. 16 shows the flow of a medium across a smooth surface such as a propeller.
Figure 17:
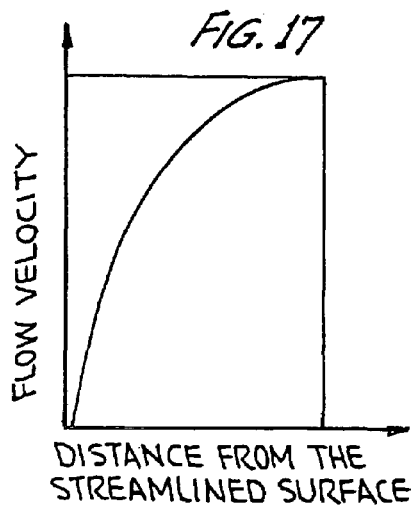
FIG. 17 graphically depicts the relationship between the velocity of flow of a medium over a smooth surface versus the distance from the surface.
Figure 18:
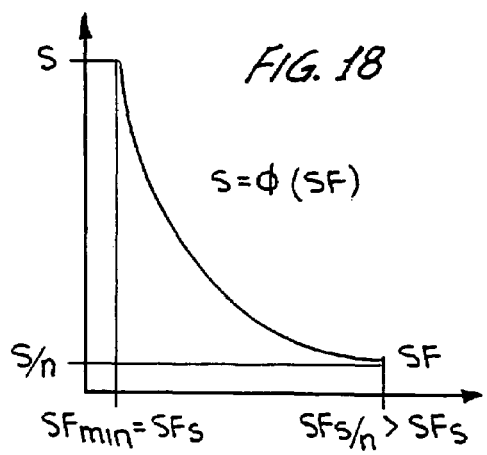
FIG. 18 graphically shows the effect of the velocity of flow on the distance between the local surface vortex flow at the surface.

FIGS. 16 through 23 depict the flow improvement properties of a liquid 80 across an ultrasonic impact machine treated surface 81. It is known that the flow of liquid across a smooth surface has a dampening layer 82 of medium thickness at the surface 81 where the speed is close to zero, and the speed of flow increases as you move further from the contacting surface (FIG. 17). The graph in FIG. 17 shows the relative speed of the liquid 80 flowing across the surface 81 as a function of distance from the area of contact between the liquid 80 and the surface 81. As a result at the contact point of the surface 81 this flow is turbulent with vortex 84 cavitation property. These vortexes 84 are relatively evenly distributed depending on the properties of the liquid 80. This is shown in FIG. 16. These vortexes 84 lead to a rippling effect in each vortex 84 of the flow with a high degree of surface cavitation. This breakdown and reforming of the vortex 84 at the surface 81 leads to pockets of high concentration of surface erosion cavitation 85 and corrosion. These areas attack the surface 81 and lead to severe surface erosion and corrosion fatigue. This is shown on the surface 81 by means of pitting that eventually leads to cracking and premature failure. The size between the centers of two consecutive vortexes, which is directly related to the size of the vortex 84, is shown in FIG. 18 as a function of the velocity of flow of the liquid 80 over the surface 81. As the speed of flow increases so the distance between the centers of each vortex 84 decreases. This leads to an increase of concentration of surface erosion cavitation 85 on the surface 81.

Figure 19:
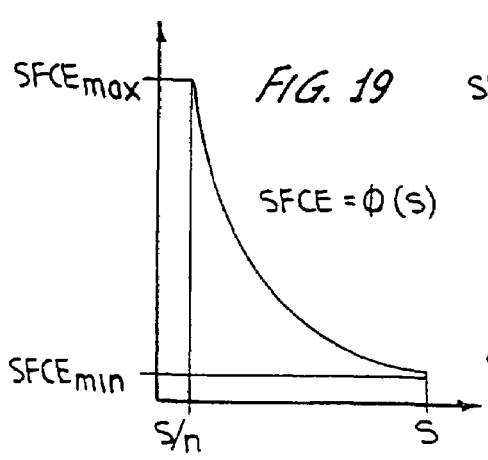
FIG. 19 is a graphical representation showing the dependence of cavitation erosion intensity on the distance between the local surface vortex flow at the surface.
Figure 20:
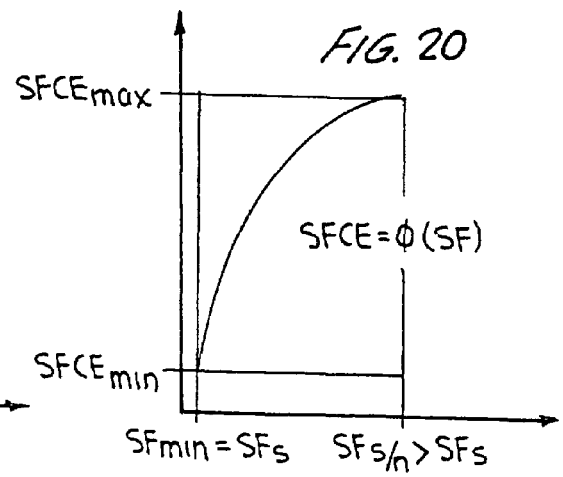
FIG. 20 is a graphical depiction of the influence of velocity of flow at the surface on the cavitation erosion intensity.

The specific force of cavitation explosion (SFCE) is a function of size or frequency of the vortexes which determine the space between adjacent vortexes as shown in FIG. 19. The larger the distance between the centers of the vortexes the lower the amount of SFCE. The smaller the distance between the centers of the vortexes the higher the SFCE. Thus, since the distance between the vortexes is dependent on the speed of flow (FIG. 18) the SFCE is a function of the speed of flow as shown in FIG. 20. It is shown in FIG. 20 that as the flow velocity increases, the erosion cavitation activity on the flow surface is increased. These relationships and observations are true for conditions of a smooth surface. This turbulent effect also affects the ability of the body to move through the medium. As a body moves through a turbulent flow, additional energy is consumed to overcome the medium resistance. This is traction resistance. The turbulence disturbs the movement stability and produces unfavorable, and potentially dangerous, resonant oscillation in the moving body. In addition, the Bernoulli effect of the velocity gradient within the associated vortexes at the surface results in an uneven distribution of pressure across the moving body. In liquid, such fluctuations of pressure cause cavitation. With a certain relationship between velocity and pressure in the flow, cavitation, in turn, causes erosion of the flow surface, disturbs the hydrodynamic characteristics of the body around which the liquid is flowing and with time produces concentrators on the surface, which in turn give rise to dynamic and fatigue failures. An example of such a moving body through a liquid medium is a ship propeller or hull of the ship.

Figure 21:
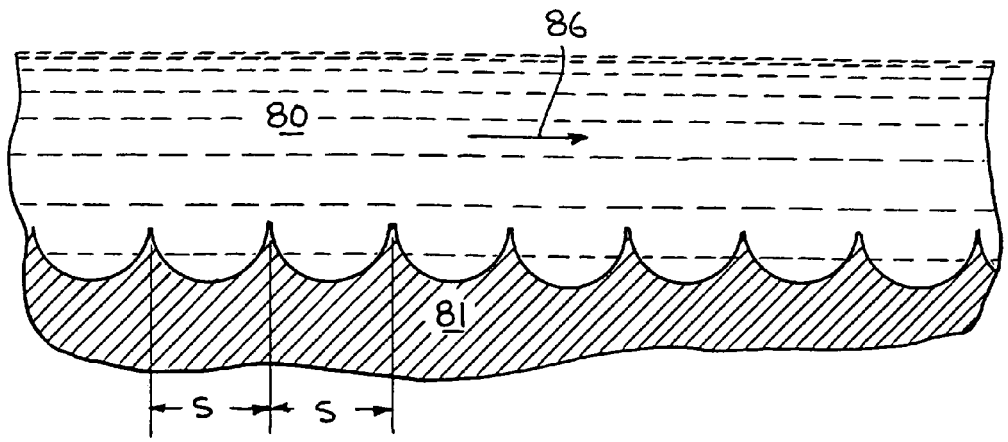
FIG. 21 shows the effect of the macro-relief alteration of the flow pattern over the surface of a propeller after ultrasonic impact machining.
Figure 22:
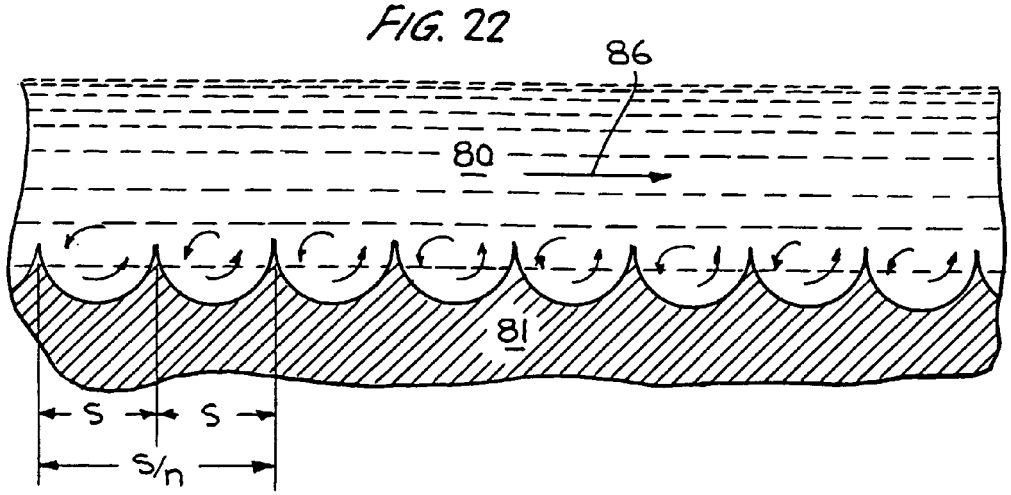
FIG. 22 shows the effect of the micro-relief alteration on the flow pattern across the surface of the propeller after ultrasonic impact machining.
Figure 23:
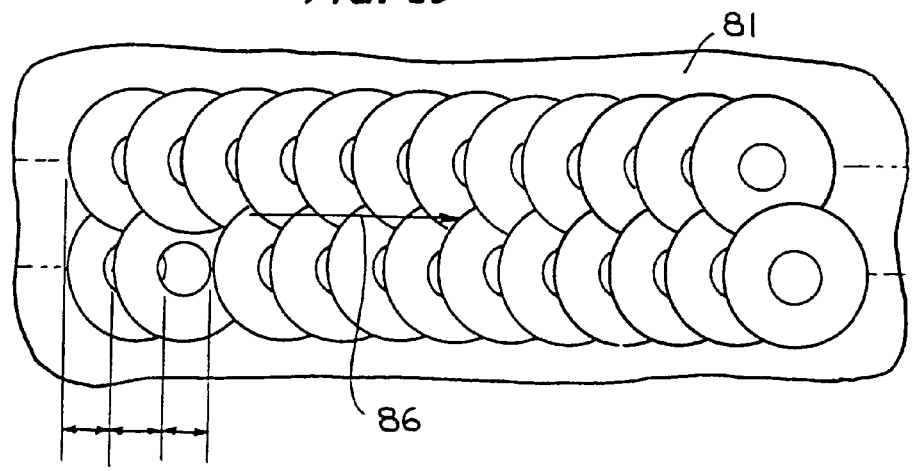
FIG. 23 is a top view of the effect of the flow of the liquid across the ultrasonic impact machined surface taking into effect the altered surface profile and micro- and macro-relief surface effects on the flow pattern.

As shown at FIGS. 21-23, the altered surface macro- and micro-relief as a result of ultrasonic impact machining such a body alters the flow characteristics of the liquid 80 at the boundary of contact between the surface 81 of the body and the liquid 80. Ultrasonic impact machining results in a superposition of a macro- and micro-relief on the surface 81 of the body such that the geometry of this relief overlaps with the possible combination of the spacing between the centers of the vortexes. This effect is shown in FIGS. 21, 22 and 23. The new surface relief of the surface 81, as defined in this invention, results in a geometry at the surface 81 that appropriately corresponds with the surface vortex flow over the surface 81.

Using FIGS. 17, 18, 19, and 20 it is possible to forecast the phase shift and size of vortexes and their overlapping.

Further to this, the liquid 80 fills the indentations on the surface 81 as a result of the ultrasonic impact machining and is basically held there. In doing so, the liquid layer where the velocity is almost zero at the surface 81 (shown earlier in FIG. 16) is not in direct contact with the surface 81 of the moving body as shown in FIGS. 21, 22 and 23 resulting in a laminar flow 86 across the surface 81 and providing a protective shield to the moving body. This new condition radically decreases the velocity gradient, eliminates the prerequisites for the curl formation of the vortex and, hence the possible formation of turbulent flow formation. This as a result provides for a stable prerequisite for laminar flow 86 across the surface 81.

As a result of the laminar flow 86, the phenomena of instability in movement, which is unfavorable and present in turbulence, is not present. As a result there is no resonant oscillations of the body being flowed around and no energy loss as a consequence of medium resistance as there is with turbulence. Hence, the cavitation and surface damage that is present in turbulence is eliminated and there is no danger of unpredictable dynamic and fatigue failure.

Accordingly, this invention provides a new method for enhancing the life, reliability and durability of bodies subjected to intense flow of medium and currents. This invention results in a new principle of fluid dynamics and surface geometry and shape. The possibility exists of new bodies that can be subjected to severe fluid flow. The invention generates a result that allows bodies to travel through a fluid medium with a condition of laminar flow which otherwise would have suffered premature failure due to the severing action of turbulent flow. This results in a new method for decreasing resistance in the flow, improving the fluid dynamics of the body through the medium, and a new method of surface protection in aggressive medium.

This invention provides the treatment of a metallic workpiece to plasticize the workpiece surface and adjacent sub-surface regions by ultrasonic impact from a set of freely axially movable impacting elements driven by an oscillating energy transfer transducer surface oscillating at a single ultrasonic frequency thereby to randomly or controllably and forcefully impact a working interface surface of the metallic workpiece with impacting elements in a set producing enough kinetic energy to plasticize the workpiece surface and the adjacent sub-surface region to a considerable depth with the workpiece residing at an ambient temperature.

The novel transducer of the invention includes features such as a multi-stage transducer with a plurality of serially connected stages having different related residual resonance frequency characteristics harmonically related to the single ultrasonic energy source frequency and characterized by a set of impacting elements having freedom of axial movement arranged for being driven by the single ultrasonic operating energy source frequency to randomly (asynchronously) or controllably impact a workpiece surface. A scanning device moves the transducer set of impact elements forcefully in contact with a workpiece surface over a designated treatment zone on the workpiece surface for uniform thermal treatment generated throughout the treatment zone by the randomly impacting elements thus serving to plasticize the metallic workpiece surface and adjacent sub-surface region.

Thus, the novel impacting element array arranged to axially move impacting elements freely over a striking path between an energy supplying contact with the transducer oscillating abutment surface and an energy conversion at impact at the workpiece surface provides a novel operation mode driving impacting elements of the set randomly into the workpiece surface.

Those novel features descriptive of the nature and spirit of the invention are set forth with particularity in the appended claims. As will be apparent to one skilled in the art, various modifications can be made within the scope of the aforesaid description. Such modifications being within the ability of one skilled in the art form a part of the present invention as embraced in these claims.

The invention claimed is:

1. Metallic body comprising a working surface to be subjected to compressive forces interfacing with a mating sub-surface region, each of said working surface and said mating sub-surface region having been plastically deformed and modified to a depth greater than a wear depth of the metallic body by machining with ultrasound impacts to produce a compressed surface layer of increased strength permitting the compressive forces to achieve a maximum strength of the metallic body metal surface.

2. The metallic body of claim 1 wherein the working surface exhibits a substantially uniform pattern of small area impact points of compressed body metal resulting from high-velocity impact members striking the metallic surface.

3. A metallic workpiece comprising a work surface for compressively interfacing with a mating sub-surface exhibiting a work surface profile obtained by machining with ultrasound impacts of the work surface and resultant transfer of ultrasound oscillations and ultrasound stress waves at sought-for impact to the work surface and said mating sub-surface, said work surface exhibiting a pattern of small area indents compressing the workpiece and said mating sub-surface being plastically deformed to eliminate inter-granular irregularities while maintaining compressive forces therein.

4. A metallic body comprising:
a working surface and a mating sub-surface region, said working surface having a plurality of indentations therein provided by ultrasound impacts in machining with a set of ultrasonic impact elements against the working surface in a random and asymmetric mode to transfer ultrasound oscillations and ultrasound stress waves at sought-for impact at the indentations to said working surface and said mating sub-surface region to provide plasticized and compressed work surface and sub-surface, the indentations arranged to correspond to values of a spacing of a surface vortex flow which forms at the working surface by a fluid as the fluid flows about the body, wherein the working surface of the metallic body, when the metallic body is in an operative mode, is immersed in said fluid in such a manner that said fluid flows across the working surface so that said fluid fills the indentations and is essentially retained therein to provide a laminar flow across the working surface.

5. A metallic body in accordance with claim 4 wherein the metallic body is a propeller.

6. Metallic body comprising a working surface to be subjected to compressive forces interfacing with a mating sub-surface region, each of said working surface and said mating sub-surface region having been plastically deformed and modified to a depth greater than a wear depth of the metallic body by ultrasound impacts in machining to produce the working surface with a substantially uniform pattern of small area impact points of compressed body metal resulting from high-velocity impact members striking the metallic surface, and the elimination of inter-granular irregularities, providing a compressed surface layer of increased strength permitting the compressive forces to achieve a maximum strength of the metallic body metal surface.

* * * * *